US007729935B2

(12) United States Patent
Theiler

(10) Patent No.: US 7,729,935 B2
(45) Date of Patent: Jun. 1, 2010

(54) METHOD AND APPARATUS FOR MANAGING WORKFLOW

(76) Inventor: David Theiler, 1001 Owyhee St., Boise, ID (US) 83705

( * ) Notice: Subject to any disclaimer, the term of this patent is extended or adjusted under 35 U.S.C. 154(b) by 673 days.

(21) Appl. No.: 10/689,610

(22) Filed: Oct. 22, 2003

(65) Prior Publication Data
US 2004/0138939 A1 Jul. 15, 2004

Related U.S. Application Data

(60) Provisional application No. 60/420,320, filed on Oct. 23, 2002.

(51) Int. Cl.
*G06Q 10/00* (2006.01)
(52) U.S. Cl. .......................................... 705/8
(58) Field of Classification Search ................ 705/8
See application file for complete search history.

(56) References Cited

U.S. PATENT DOCUMENTS

| | | | | |
|---|---|---|---|---|
| 5,548,506 A | * | 8/1996 | Srinivasan | 705/8 |
| 5,734,837 A | * | 3/1998 | Flores et al. | 705/7 |
| 5,826,239 A | * | 10/1998 | Du et al. | 705/8 |
| 5,870,545 A | * | 2/1999 | Davis et al. | 709/201 |
| 5,991,733 A | * | 11/1999 | Aleia et al. | 705/8 |
| 6,067,548 A | * | 5/2000 | Cheng | 707/103 R |
| 6,278,977 B1 | * | 8/2001 | Agrawal et al. | 705/7 |
| 6,308,164 B1 | * | 10/2001 | Nummelin et al. | 705/9 |
| 6,314,434 B1 | * | 11/2001 | Shigemi et al. | 707/203 |
| 6,341,287 B1 | * | 1/2002 | Sziklai et al. | 707/102 |
| 6,349,238 B1 | * | 2/2002 | Gabbita et al. | 700/101 |
| 6,453,038 B1 | * | 9/2002 | McFarlane et al. | 379/265.05 |
| 6,606,740 B1 | * | 8/2003 | Lynn et al. | 717/100 |
| 6,725,428 B1 | * | 4/2004 | Pareschi et al. | 715/530 |
| 6,744,761 B1 | * | 6/2004 | Neumann et al. | 370/389 |
| 6,772,407 B1 | * | 8/2004 | Leymann et al. | 717/100 |
| 6,993,712 B2 | * | 1/2006 | Ramachandran et al. | 715/513 |
| 7,035,809 B2 | * | 4/2006 | Miller et al. | 705/8 |
| 2002/0078432 A1 | * | 6/2002 | Charisius et al. | 717/102 |

OTHER PUBLICATIONS

User's Guide to Microsoft Project, 1995.*

* cited by examiner

*Primary Examiner*—Jonathan G Sterrett
(74) *Attorney, Agent, or Firm*—Dickstein Shapiro LLP

(57) ABSTRACT

A workflow process management application (WPMA) for a specific organization is created via a web application that can be implemented using a web server front end and a database back end. An administrator user operates the application by using a built-in administrative function to create objects such as users, groups, departments, locations, acuities, activities, and skills. The administrator or another suitable user can then use a built-in defining function to finalize objects and create instances of the objects corresponding to the organization. Appropriate users can use the plan function to allocate specific users to specific departments to ensure that all activities are assigned an appropriate amount of workers having the appropriate skills. When (or after) the work is performed the actual workflow data can be electronically gathered (if possible), or manually entered. Reports can then be generated to show differences between the planned workflow and the actual workflow.

20 Claims, 9 Drawing Sheets

METHOD AND APPARATUS FOR MANAGING WORKFLOW

This application claims priority from U.S. provisional patent application Ser. No. 60/420,320 filed Oct. 23, 2002, the contents of which are hereby incorporated by reference.

FIELD OF INVENTION

The present invention relates to computer based workflow process management systems. More specifically, the present invention relates to a development environment for creating software based workflow process management tools.

BACKGROUND OF THE INVENTION

Workflow process management generally relates to the automated work management. As used herein, work generally relates to a function performed in business. Examples of tasks include processing a loan application (in the banking industry), or treating a patient (in the hospital industry). However, work need not be limited to just those functions performed in businesses. For example, work performed by governmental agencies, charities, branches of the military, or recreational tasks performed by a group of hobbyists may also be candidates for workflow process management. Thus, a workflow process management system may be considered to be a system which utilizes a set of procedural rules to manage how work is performed by participants.

The work may include tasks which require performance, documents which require creation or editing, or information which require development. For example, in the banking industry, a variety of loan documents, such as promissory notes, etc., may need to be created. Similarly, information, such as an applicant's credit rating may need to be developed by ordering credit reports. Different industries will have different work requiring different tasks, documents, and/or information. For example, a hospital require the tasks of treating a patient's condition, collecting/developing information such as a patient's medical history, and the creation and processing of a billing record for the patient.

Although the type of work may vary from entity to entity, and from industry to industry, work can still be classified into four categories, namely fixed activities, variable activities, periodic, and offline activities. Fixed activity relates to work which is not volume sensitive and which needs to be performed daily. Variable activities are daily activities which is volume sensitive. Periodic activities relates to non-daily activities, whether volume sensitive or not. Offline activities denotes any special activities such as training, special projects, or meetings. Each type of work (including time allocated for meals or breaks) can be converted into an equivalent amount of time. When expressed in hours, this time is known as earned hours. A department, which by definition is an entity which exists for performing a set of core functions, maximizes its production when it maximizes its earned hours.

For example, a department for creating widgets may find that it requires one worker one hour to produce one widget. The creation of widgets is clearly volume sensitive. Thus, widget creation is a variable activity. If the eight widgets are produced per day then the department would have 8 earned hours that day. If instead, the department produced 80 widgets in a day, that department would have 80 earned hours.

The participants managed by a work flow process management system may be different types of workers. For example, some workers are full time workers while other workers may be part-time workers. Additionally, the period of time worked by each worker may be different. Flexible time policies and different shifts may mean that different workers work different periods of time, even though the different workers are full time employees. Additionally, participants may differ from each other based upon skill level, experience level, or licensure level. For example, in a hospital setting, only physicians may be authorized to perform certain medical duties, while physicians or nurses may perform other duties. Similarly, nurses have difference level of licensure. Thus, only a registered nurse (R.N.) may be authorized to perform certain procedures while either licensed professional nurses (L.P.N) or registered nurses (R.N.) may perform other procedures.

In order for a department to perform its earned hours, the department must have sufficient worker resources to work its earned hours. Although workers may work different shifts, have different skills levels, etc., just like work to be performed can be converted into earned hours, workers can also be expressed as an equivalent amount of time. The time unit normally used for workers is known as a full time equivalents (hereinafter "FTE"). One FTE usually represents the amount of work normally performed by a worker during a day, and can be converted into a number of hours. This conversion is often affected by labor laws and regulations. For example, in many instances, during a standard 8-hour shift, a worker earns paid break at a rate of one 0.25 hour paid break per four hours worked. Thus, one FTE is equal to 8.0 hours with two 15 minute breaks within each of two consecutive four hour periods.

Since work and participants can be converted into units of time, it can be seen that a department can only ensure that all of its earned hours are converted into production if the department is staffed by an equivalent amount of FTEs. For example, if one FTE is equivalent to eight hours, the widget department would require 1 FTE per day to work 8 earned hours to produce 8 widgets. Conversely, if the widget department has 3 FTE of workers per day but only orders for 8 widget per day, two FTEs are wasted because the work can be performed by one FTE's equivalent of workers.

Each business (or other entity) has its own industry specific work and participants. Additionally, even among businesses in the same industry, the work and participants vary from business to business. In order to accommodate these differences, the traditional methodology for constructing workflow process management systems required one or more consultants to study each new business to identify its work, participants, and rules. Once the study has been concluded, a custom workflow process management application (WPMA) is created. When executed on a computer system, the WPMA and the computer system form a workflow process management system. Due to the differences between businesses, much of the work performed in constructing one WPMA generally cannot be reused for another WPMA. Accordingly, there is a need and desire for a system for quickly creating workflow process management applications while leveraging work previously performed in developing other WPMAs.

SUMMARY OF THE INVENTION

The present invention provides a method and apparatus for building a workflow process management application (WPMA) suitable for use with any organization. In an exemplary embodiment, the apparatus is a standard web based application built using a web server as a front end and a database server as a back end. The application initially includes web pages and database entries which permit an administrator to define objects such as users, groups, departments, locations, acuity, activities, and skills required in a WPMA. The application may optionally also include template files including predetermined objects to facilitate faster development. Once the basic objects have been created by the administrator, the application is further customized by permitting the administrator or other users to supply additional data to further define the previously created objects and to define new objects. Examples include providing data associated with activities, resources, shifts, skills, and users. At this point the WPMA is ready for use. Each department can use the application to plan its workflow and either manually and/or automatically enter actual workflow data and reports can query the database to obtain workflow data.

The foregoing and other advantages and features of the invention will become more apparent from the detailed description of exemplary embodiments of the invention given below with reference to the accompanying drawings.

DETAILED DESCRIPTION OF THE INVENTION

I. Introduction

Figure 1:
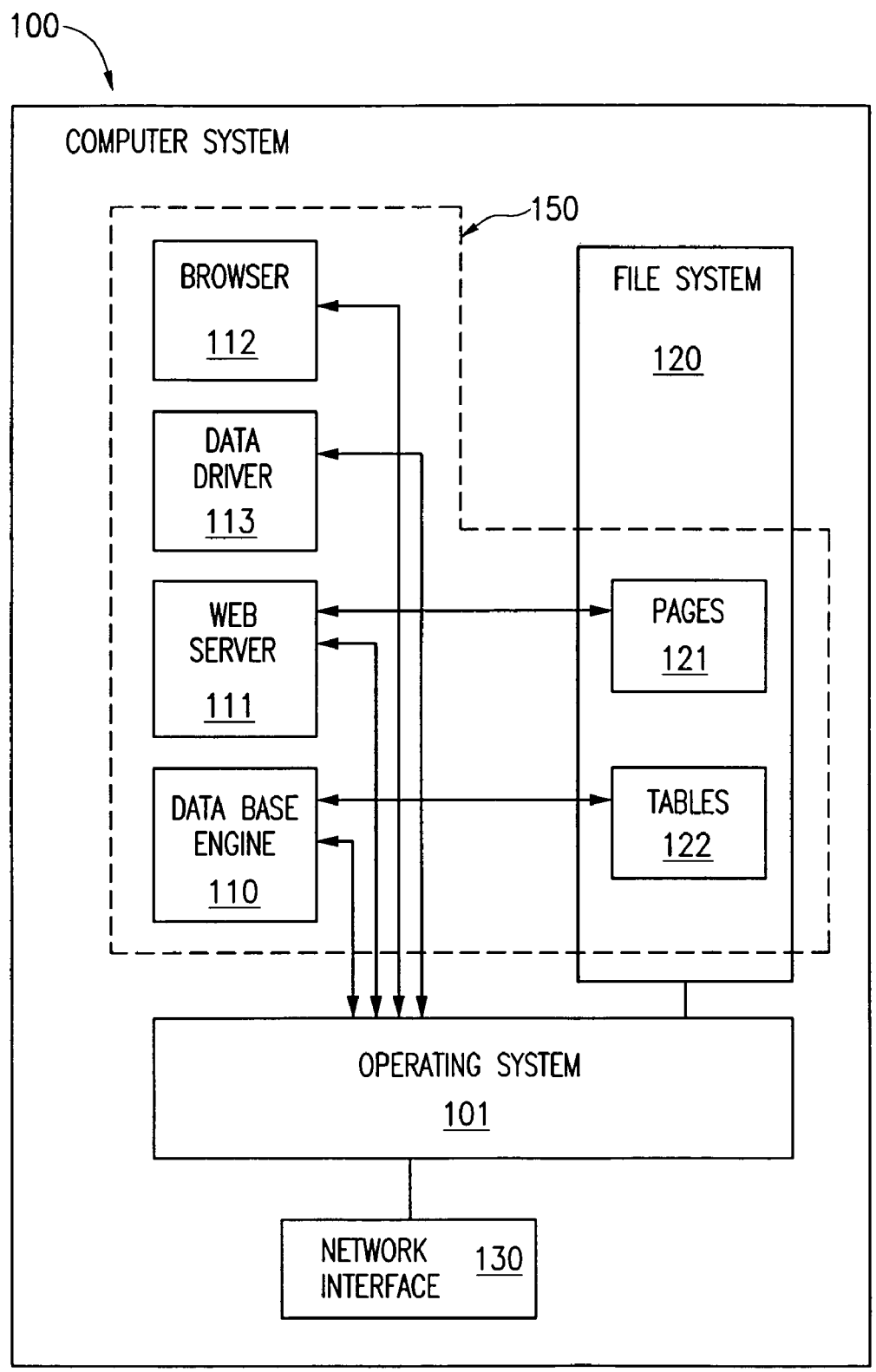
FIG. 1. is a block diagram of a computer system with the environment of the present invention.

Now referring to the drawings, where like reference numerals designate like elements, there is shown in FIG. 1 a computer system 100. The computer system 100 includes an operating system 101 which manages the hardware resources of the computer, such as the network interface 130, and provides support for application programs executing on the computer system 100. One example of a support service provided by the operating system 101 includes managing at least one file system 120 for the executing applications 110-112. The applications 110-112 include at least a database engine 110, a web server 111, and a browser 112. Although the browser is illustrated in FIG. 1 as executing on the computer system 100, it should be noted that the browser may instead, or in addition, be executed on a different computer system than computer system 100. That is, the browser may be executed on a different computer system which is capable of accessing the web server 111 of computer system 100 via the network interface 130. The different computer system, which is not illustrated to avoid cluttering the figure, may be located on a local area network, or across a wider public or private network, for example, the Internet.

The software 150 of FIG. 1 will at times be referenced as the "development environment" or the "workflow process management application" (WPMA). This is because, as described below, the software 150, as initially configured, is primarily a software development environment for producing a WPMA, but when customized, becomes primarily a WPMA.

The development environment 150 includes the browser 112, web server 111, and database engine 110 applications. These three applications are configured to behave as a web based client-server application. That is to say, the browser 112 acts as a front-end to the development environment 150 by managing input and output from the web server 111. The environment 150 also optionally includes a data driver 113. The data driver 113 is used to permit the environment 150 to receive messages from other software components. For example, when used in a health care/hospital context, the data driver 113 can be a stand alone application configured to receive Admission Discharge and Transfer (ADT) messages over network interface 130 and then input corresponding data into the environment 150.

The code of the development environment 150 includes the web pages 121 managed by the web server. The web pages 121 include pages which contain server side scripts. The server side scripts may be implemented in any language which can be executed by the web server 111. In one exemplary embodiment, the server side scripting language is the Java language developed by Sun Microsystems supplemented by the Business Components for Java (BC4J) framework developed by Oracle. The web pages 121 may additionally include client-side scripts. For example, client-side scripting may be used to implement user interface features. The client-side scripts may be implemented using any suitable script language understood by the browser 112 application. For example, the client-side scripts may be coded in Javascript or VB script.

The database engine 110 is used to maintain a plurality of database tables 112, under the direction of the web server 111. The database tables 112 are used to store objects and data associated with the WPMA. Such data may include, for example, the data associated with each item of work and the data associated with each participant. The web server 111 manages the database engine 110 by sending the database engine instructions in a query language supported by the database engine 110. In one exemplary embodiment, the database engine 110 supports the SQL query language. However, other query languages supported by the database engine 110 may be used.

The development environment 150 is multi-user. That is, different users can authenticate to the development environment 150 and be granted varying degrees of access to the development environment 150. In one exemplary embodiment, each user is associated with one of the following five groups: Administrator, Executive, Manager, Supervisor, and Staff. Users who are classified as Administrators have unlimited access to the development environment 150. These users may view, edit, or delete any object in the environment 150. By contrast, users who are classified as Staff have very limited access to the development environment 150. These users are unable to customize objects in the development environment and are essentially restricted to viewing their own data in the WPMA 150 once the WPMA 150 has been defined. Users who are Executives, Managers, and Supervisors have similar rights over varying degrees of scale. More specifically, each Executive, Manager, or Supervisor can view and edit data and objects associated with the portions of the organization they are responsible for and for those workers whom they supervise. Thus, a user who is a Supervisor may be able to edit the work schedule of a user he manages, but be denied access to another user whom he does not manage. However, an Executive may be considered to be a supervisor for every worker in the organization and therefore be permitted to view and edit data associated with anyone in the organization.

When first executed, the development environment 150 exists as a minimal series of web pages and database tables. In one exemplary embodiment described below, the development environment 150 may also include a series of template files. A default Administrator user must access the development environment 150 to create a series of objects to transform the development environment 150 into a WPMA. The objection creation is initially performed using the below described Administration menus, and then additional objects are created, or existing objects are edited using the below described Workflow pages. The creation of the below described objects are performed by making corresponding changes to the series of minimal web pages and database tables. In many instances, new web pages and/or database tables are created.

Figure 2:
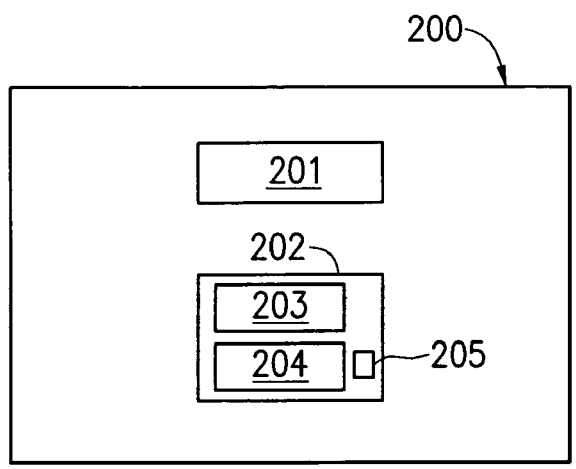
FIG. 2. an illustration of a page used for user authentication.

Since the development environment 150 is a web-based application, a user accesses the development environment 150 by starting the web browser and navigating to a uniform resource locator (URL) of the development environment 150. As shown in FIG. 2, the user is presented with an initial page 200. The initial page 200 is used to perform user authentication and includes a portion 201 which may include textual and graphical data that identifies the development environment, and a dialog box 202 which includes fields 203, 204 for respectively accepting a user name and a password. The initial page 200 also includes a button 205 which when pressed causes the development environment 150 to authenticate the user based upon the data entered in the user name and password fields 203, 204. If the entered information corresponds to a valid user, that user is authenticated. Otherwise, page 200 is re-displayed.

Figure 3:
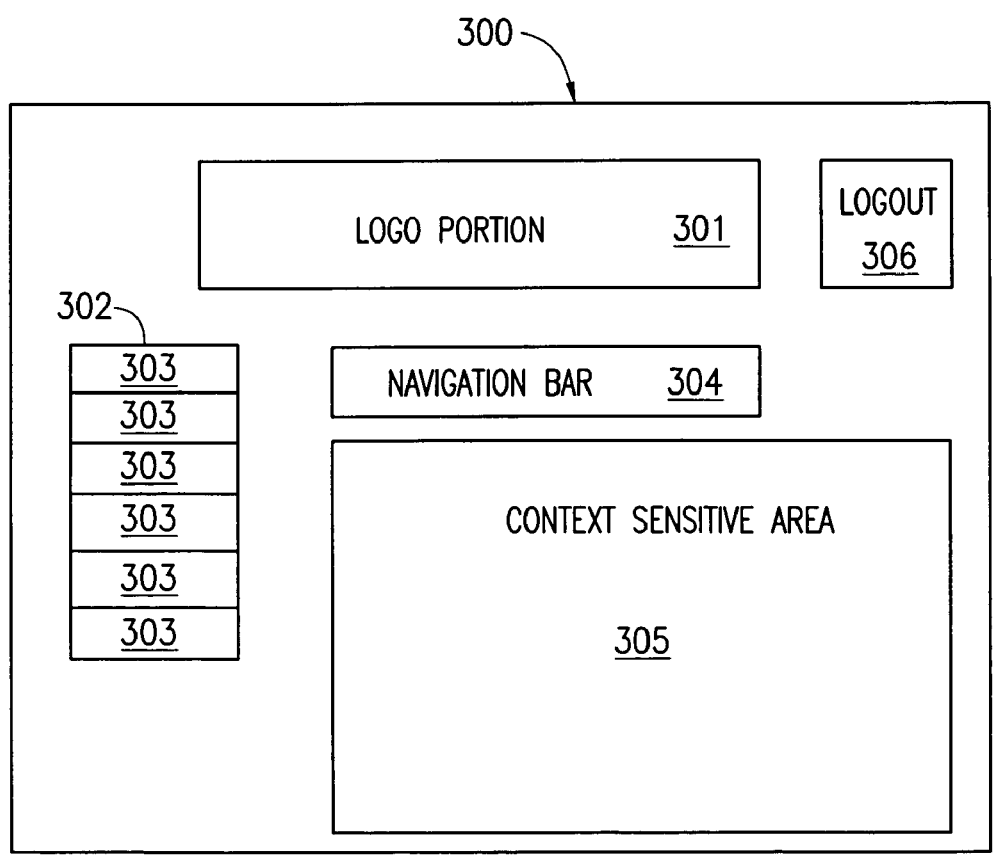
FIG. 3 is an illustration of a generic page.

FIG. 3 is a diagram illustrating a generic page 300. Most of the pages discussed below are based upon the generic page 300, which includes a logo portion 301, a menu bar 302, a plurality of menu items 303, a navigation bar 304, and a context sensitive area 305. The logo portion 301 is an area which may contain any textual or graphical information. The logo portion 301 may be used, for example, to display a logo of the organization associated with the WPMA 150. The menu bar 302 serves as a container for a variable number of menu items 303. Each menu item 303 can be selected (e.g., pressed by a mouse click) to generate a user event. The navigation bar 304 typically includes textual and/or graphical data identifying the location of the page 300 or the relationship between page 300 and one or more pages. The navigation bar 304 may also include controls for rapidly moving to certain predefined pages. The context sensitive area 305 is used to present different inputs, outputs, and controls to the user. The logout button 306 may be used by the user at any time to sign off from the development environment.

Figure 4:
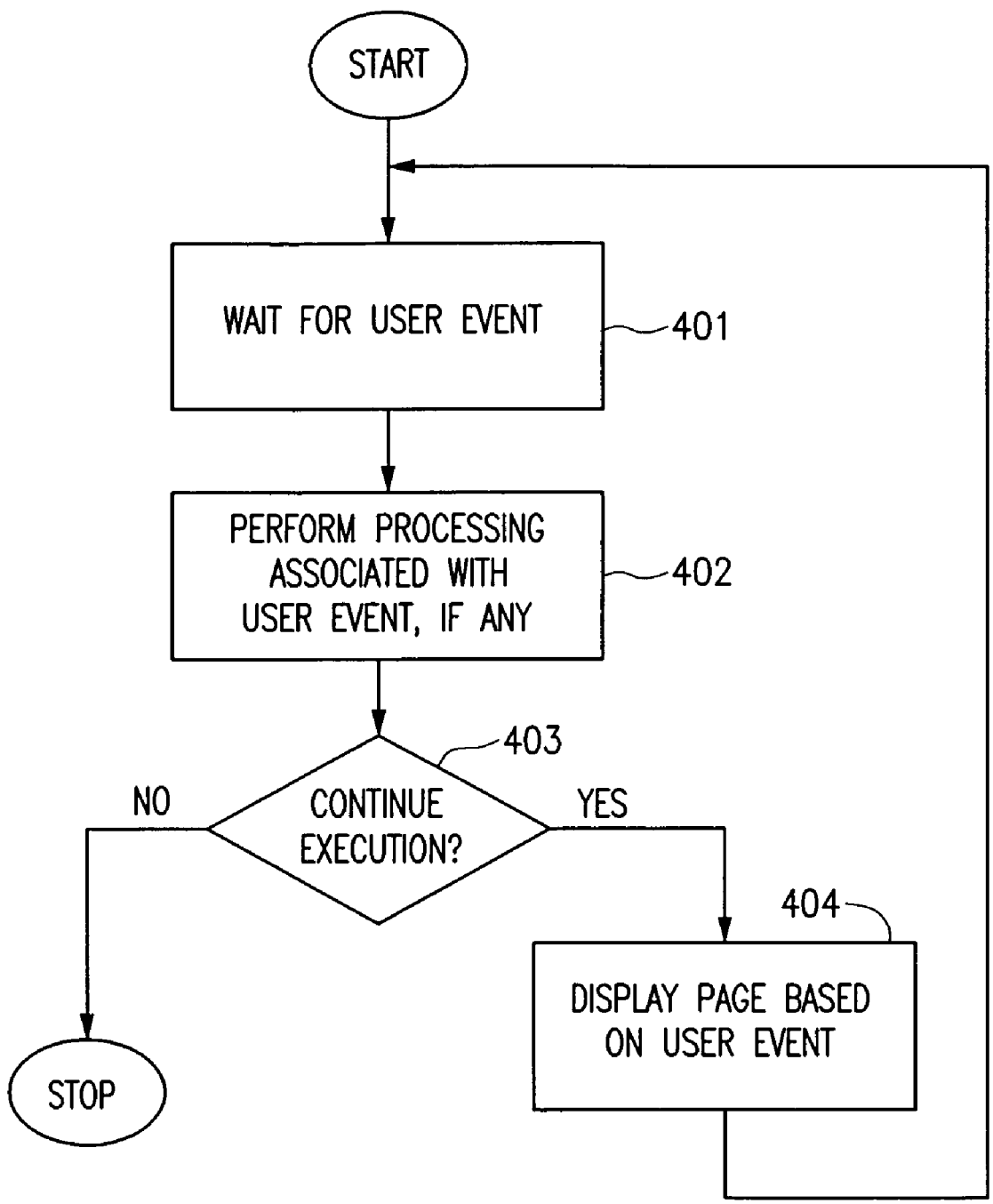
FIG. 4 is a flow chart illustrating how pages are processed.

FIG. 4 is a flowchart illustrating how pages, such as the generic page 300, are processed. The illustrated process begins at step 401, where (it is assumed that the page being processed has been displayed to the user). The WPMA 150 waits for a user event. Step 402 is executed when a user event is received at step 401. If the user event requires processing, the processing is performed. For example, if the user event corresponded to clicking a logout button, a logout flag could be set. At step 403, the WPMA 150 checks to see whether further program execution is required. In the previous example, where the logout button was activated to set a logout flag, step 403 would yield a "No" result, and execution would terminate. If the logout button was not pressed, the answer would be "Yes" and execution would continue at step 404. In step 404, the page associated with the user action would be displayed. For example, the user may have activated a button associated with navigating to a specific page. In that instance, the particular page would be displayed at step 404, and execution would loop back to step 401.

II. Start Page

When a user has been properly authenticated, the user is shown a start page. As discussed above, this start page is a variation of the generic page 300. In one exemplary embodiment, the start page displays an organization tree browser in the context sensitive area 305, and the menu 302 include menu items 303 related to report generation (which varies in accordance to the access privileges of the user), a help screen, and administrative activities if consistent with the access privileges of the user. The organization tree browser is shown in greater detail in FIG. 5A. As illustrated, the organization tree browser 500 is a hierarchical type control used to browse lists of departments by group. That is, the leaf nodes of the hierarchical type control correspond to departments, while the interior nodes correspond to groups, and the root node corresponds to the organization. The hierarchical type control includes several control points denoted by boxes 501 having "+" and "−" symbols. A box with a "+" symbol may be clicked to expand a hierarchy of data associated with that box. When clicked, the box with the "+" symbol changes to a box with a "−" symbol. Thus, in FIG. 5A, the illustration shows an organization known as "St. Luke's Hospital" (root node), having a Patient Services Group 502a (interior node) and a Support Services Group 502b (interior node). More specifically, the partially expanded control shows that the Support Services Group 502b (interior node) further comprises a Finance Group 503a (interior node) and a Support Group 503b (interior node), and that the Support Group 503b includes an Engineering department 504a (leaf node) and a Housekeeping department 504b (leaf node). In addition to showing the hierarchical relationship between departments, the organization tree browser can also be used by a user as a navigation mechanism to view information regarding any department (if consistent with the access privileges of the user). For example, a user having privileges to view data regarding the Engineering department can simply click on the text label "Engineering" in organization tree browser 500.

The Start Page therefore permits a user with appropriate access privileges to perform up to four actions. Users who do not have full privileges will be limited to only selecting those actions consistent with their access privileges. These action include using the menu items to cause the WPMA 150 to display a help page, a Administration Menu page, and a Report page. Additionally, the user can also use the hierarchical control to display a Workflow Page associated with a department.

III. Help Page

The Help Page refers to a page which can be accessed by selecting the Help menu item from the Start Page. The Help Page may comprise the entire help system, in which case the context sensitive area 305 may include at least one text and/or graphical element which offers the user help information. Alternatively, the Help Page may refer to the root page of a help system which includes further pages having at least one text and/or graphical element which offers the user help information.

IV. Administration Menu Page

Figure 6:
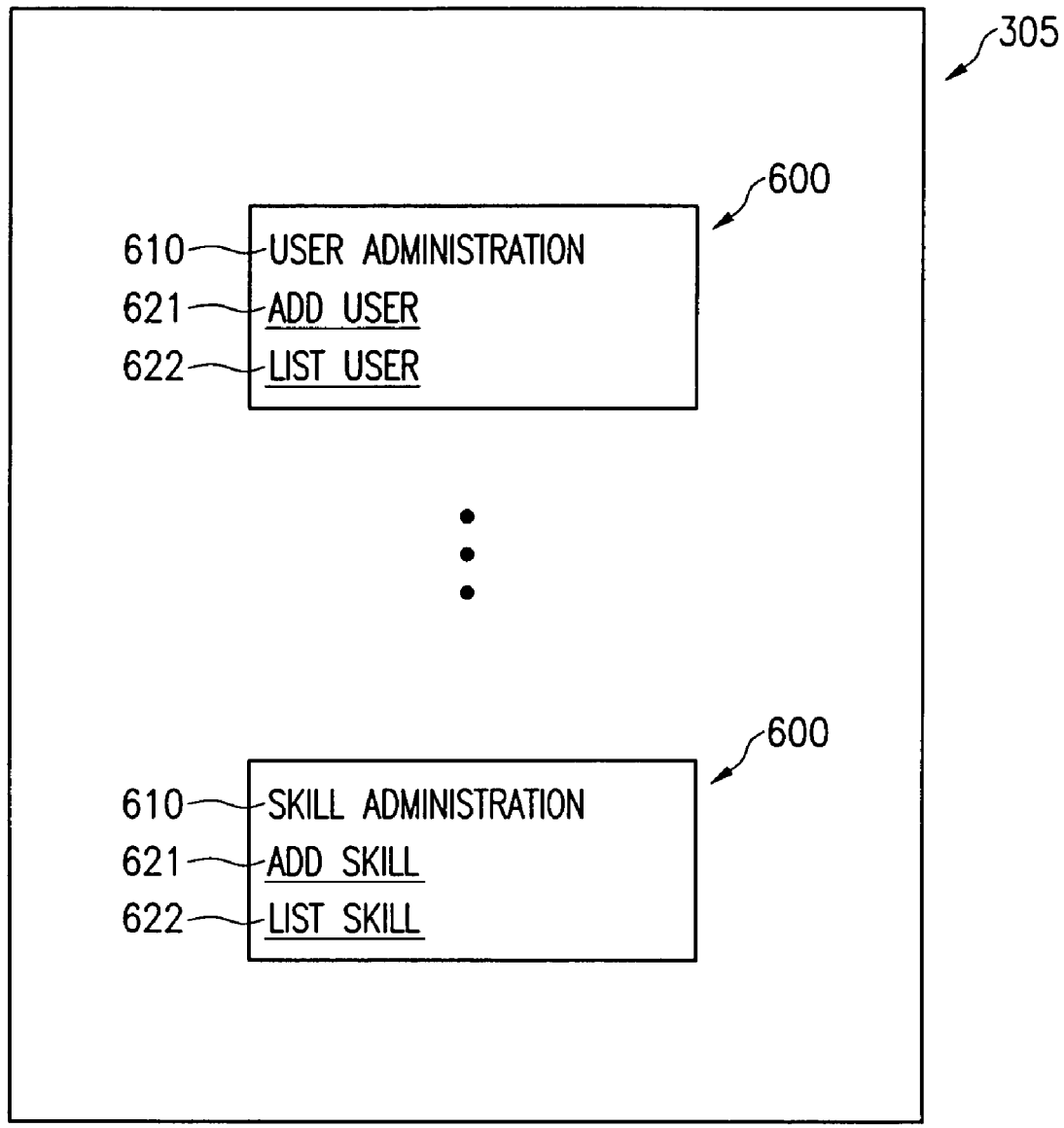
FIG. 6 is an illustration of the context sensitive area of the Administration Menu page in one exemplary embodiment.

The Administration Menu page refers to a page which can be accessed by selecting the Administration menu item from the Start Page. The Administration Menu page is a page based on the generic page 300. The context sensitive area of the Administrative Menu page in one exemplary embodiment is illustrated in FIG. 6. As shown in FIG. 6, the context sensitive area 305 includes a series of controls 600. In one exemplary embodiment, the series of controls 600 include controls directed to User Administration, Group Administration, Department Administration, Location Administration, Acuity Administration, and Skill Administration. In one exemplary embodiment the controls 600 include an additional control related to Template Administration. Each control 600 (except as otherwise described below with respect to those controls in the Template Administration page) includes a text label 610 associated with one administration area and two hyperlinks 621, 622. The two hyperlinks 621, 622 are respectively used to "add" and "list" objects associated with the administration area. For example, for the control 600 related to Skill Administration, the two hyperlinks 621, 622 would respectively be used to add a new skill and list all skills.

IV.A. Template Administration

The template administration page is used for loading a pre-defined group of objects into the WPMA 150. That is, while other pages accessible via the Administration Menu page permit a user of the WPMA 150 to define objects such as users, groups, departments, location, acuity, and skills to customize the WPMA 150 to become consistent with a particular organization, the template administration permits a user to load a predetermined series of objects into the WPMA 150. For instance, WPMAs customized for different organizations in the same field of endeavor would likely include several objects which are in common. For examples, objects related to groups, departments, acuity, and skills may share many common elements. Thus, when developing a WPMA 150, it may be advantageous to begin with a set of objects commonly associated with similar organizations.

The template administration page permits the user to choose and load a set of such objects. These objects may be provided as part of the WPMA 150, or they can be separated provided. In one exemplary embodiment, the set of objects and information regarding the objects (e.g., documentation describing the predefined objects, or help files, etc.) are packaged into a single file, and the template administration page is based the generic page 300 and includes a customized area 305 which includes a browser permitting the user to view the information and to load the objects.

IV.B. User Administration

The User Administration controls are used to manage the users of the WPMA 150. When a user having the appropriate access privilege selects the "Add User" 621 hyperlink, the next page displayed by the WPMA 150 is the Add User page. Alternatively, when a user having the appropriate access privilege selects the "List User" 621 hyperlink, the next page displayed by the WPMA 150 is the List User page.

Figure 7A:
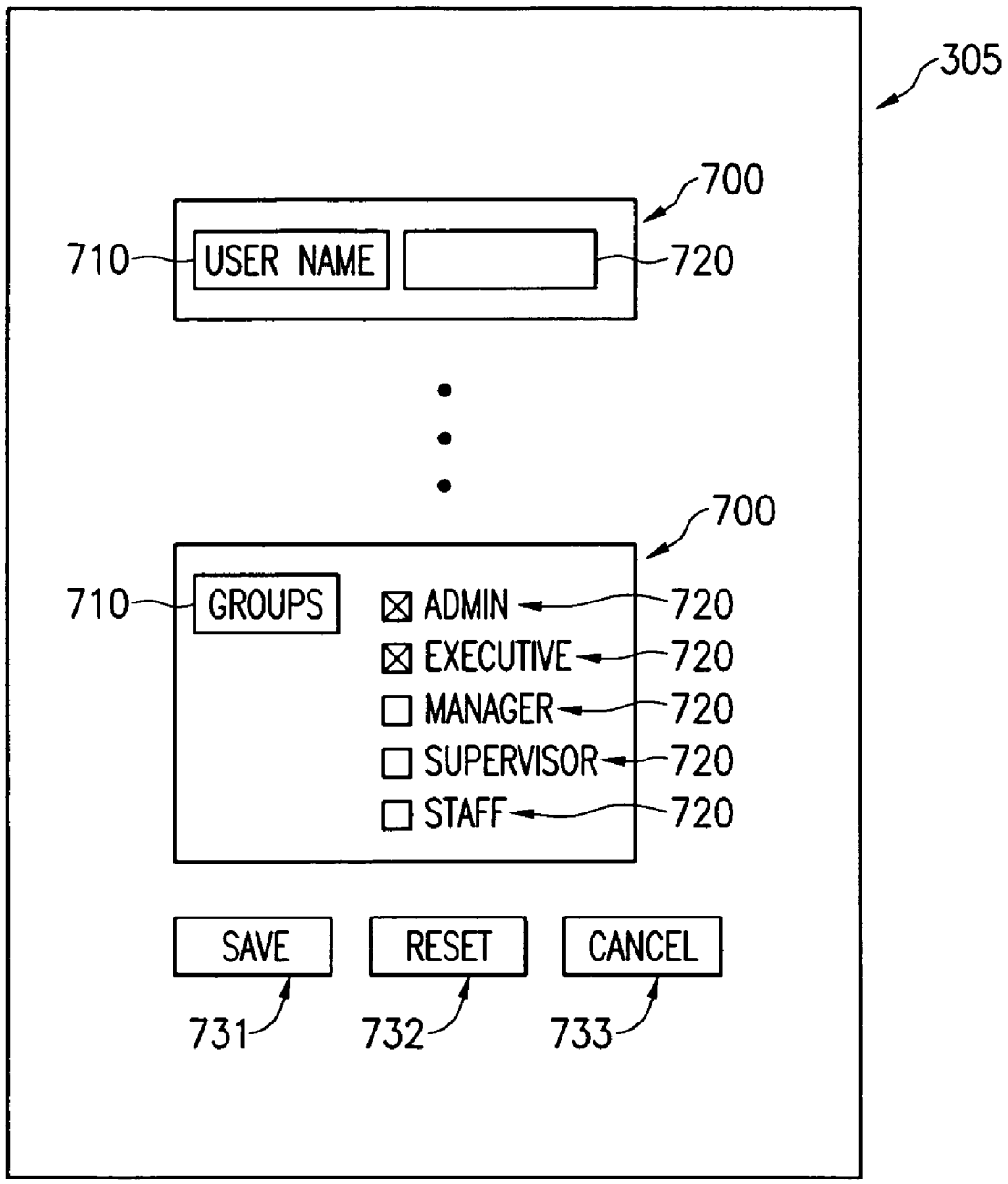
FIG. 7A is an illustration of the context sensitive area of an Add User page in one exemplary embodiment.

The Add User page is based on the generic page 300. The context sensitive area of the Add User page in one exemplary embodiment is illustrated in FIG. 7A. As shown in FIG. 7A, the context sensitive area 305 include a series of fields 700. Generally, each field 700 includes a text label 710 and at least one associated control 720. The text label 710 identifies a database entry while the at least one associated control 720 may be used to enter a value for the database entry identified by the text label 710. In one exemplary embodiment, the series of fields 700 include fields with text labels 710 and text input fields 720 associated with database entries which store data regarding a user name, a user's first, middle, and last names, the user's title, telephone number including extension, and so forth. The exemplary embodiment further includes additional fields 700 with text labels 710 and at least one check box control 720 for setting a series of flags. The flags available in the exemplary embodiment include one for identifying whether the entry is disabled (i.e., the user is defined but currently disabled from using the WPMA 150), and a series of text boxes to identify which access group(s) are associated with that user. Finally, FIG. 7A also shows three controls 731, 732, 733 respectively used to save the data entered in the control fields 720, reset the data in the control fields 720 to default values, or cancel the Add User function.

Figure 7B:
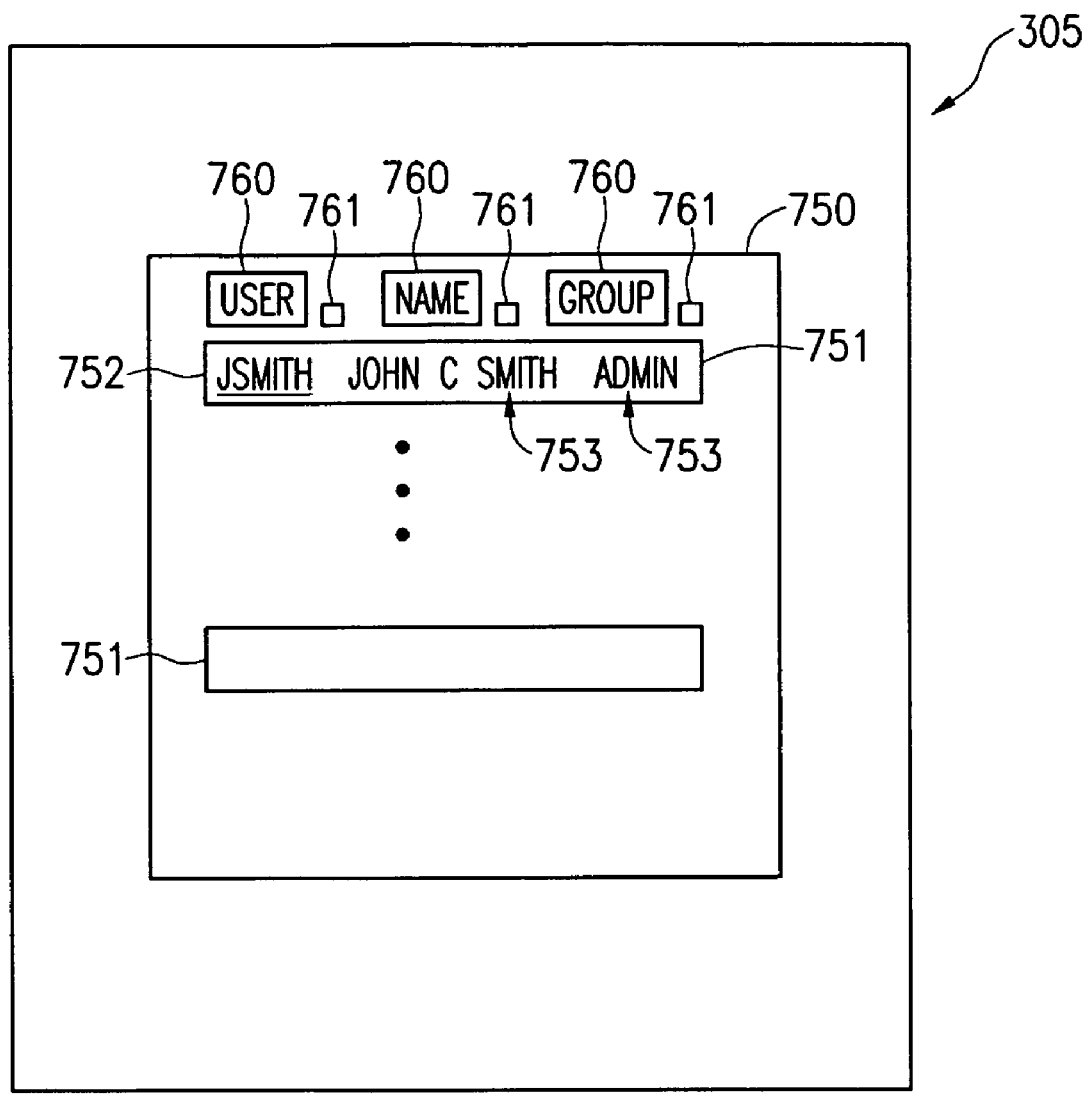
FIG. 7B is an illustration of the context sensitive area of a List User page in one exemplary embodiment.

The List User page is based on the generic page 300. The context sensitive area of the List User page in one exemplary embodiment is illustrated in FIG. 7B. As shown in FIG. 7B, the context sensitive area 305 includes a table 750 having a plurality of rows 751. Each row 751 corresponds to a previously defined user name, and includes a hyperlink 752 having text identifying the user name, and a limited amount of associated data 753. In one exemplary embodiment, the associated data is text displayed in each row with the user name including the user's first, middle, and last names, and the access groups associated with each user. The List User page may further include text labels 760 for each column of the table. Each text label may be associated with a control 761, which when toggled may cause the table to be sorted based on the data of the associated column.

Selecting a hyperlink 752 brings up an Edit User page, which is essentially identical to the Add User page (FIG. 7A). Two differences between the Add User Page and the Edit User page are (1) in the Add User Page each field 720 is generally blank while in the Edit User page, each field includes the data currently stored in the database for that field; and (2) the Edit User page includes a control (e.g., a button) which when used deletes the user.

The above described relationship between the Add/Edit User and List User pages shown in FIGS. 7A and 7B is generally maintained for each administration area. Therefore, the descriptions below relating to the Add/Edit and List functions for Group Administration, Department Administration, Location Administration, Acuity Administration, and Skill Administration will be made without referring to additional drawings and the description will generally only describe the differences between those pages and the previously described Add/Edit User and List User pages.

IV.C. Group Administration

The Group Administration controls are used to manage the Groups of the WPMA 150. When a user having the appropriate access privilege selects the "Add Group" 621 hyperlink, the next page displayed by the WPMA 150 is the Add Group page. Alternatively, when a user having the appropriate access privilege selects the "List Group" 621 hyperlink, the next page displayed by the WPMA 150 is the List Group page.

Figure 5A:
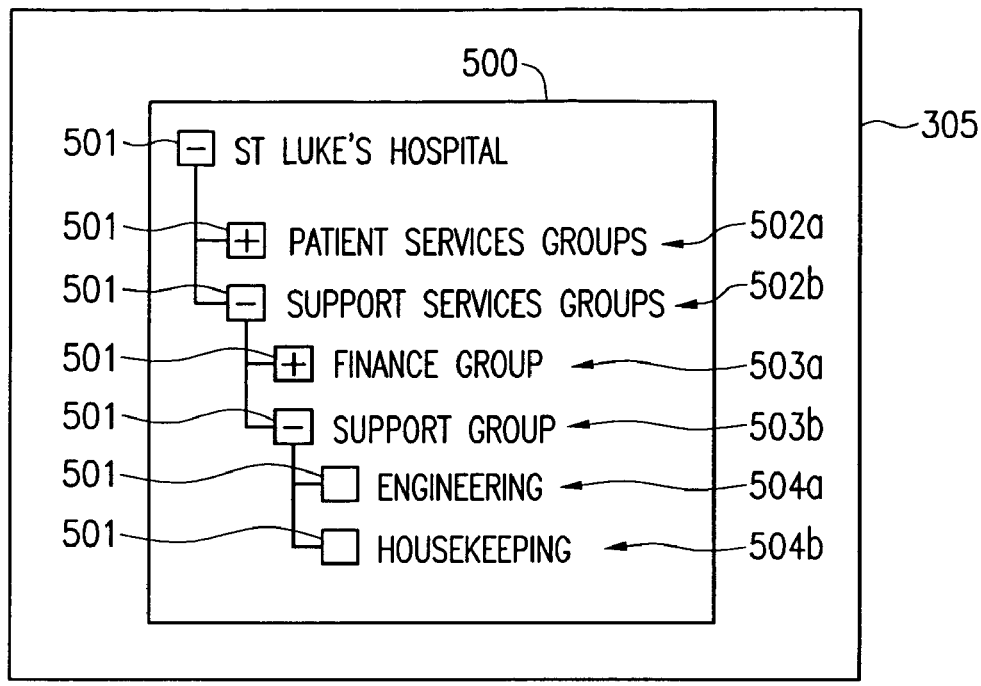
FIG. 5A is a illustration of the context sensitive area of the start page in one exemplary embodiment.

The Add Group page is used to add a new group to the WPMA 150. The Add Group page is similar to the Add User page shown in FIG. 7A, however, the fields of the Add Group page are different and used to collect information relating to adding a new group to the WPMA 150. In one exemplary embodiment, these fields include fields for receiving a Group Name, a Description, and a control for selecting one or more users from a list of all users who belong to the group being defined. Additionally, context sensitive area 305 of the Add Group page also includes the organization tree browser 500 (FIG. 5A). Thus, in order to add a new group, the user would use the organization tree browser 500 to navigate to a point where the new group should be added, enter a new group name in the Group Name field, a description for the group in the Description field, and identify the users who belong to the group. The Add Group page also has the same save 731, reset 732, and cancel 733 controls of the Add User page. These controls 731-733 can be used to control whether to create and save the new group.

The List Group page is used to list all groups defined in the WPMA 150. The List Group page differs from the List User page because the organization tree browser 500 (FIG. 5A) better illustrates a hierarchical relationship than a table. Thus, the context sensitive area of the List Group page includes the organizational tree browser 500. To see a list of groups, the user can expand the organization chart by clicking on the boxes with the "+" symbol to show each level of groups. The user can navigate to an Edit Group page by clicking on the group name of the organization chart.

The Edit Group page is virtually identical to the Add Group page, except that previously entered data regarding the selected group is automatically placed in the appropriate fields. Like the Edit User page, the Edit Group page also includes a control for deleting the group. To edit a group, a user can update or replace the previously entered data and use the save control 731 to update the data.

IV.D. Department Administration

The Department Administration controls are used to manage the Departments of the WPMA 150. A department is an entity which exists for performing a set of core functions. Typically, each department will have several activities associated with it. The concept of classifying activities according to time, i.e., fixed, variable, periodic, and offline activities, has already been introduced. Another way to classify activities is by identifying whether an activity is a "unit of service." A unit of service is an activity related to the main function of a department, performed in one department and visible to at least another department. For example, if the main function of a department is to create widgets, the activity of producing a widget would be a unit of service because the activity is a main function for the department and because the production of the widget would be visible to other departments, for example, an accounting department and perhaps a shipping department. When a user having the appropriate access privilege selects the "Add Department" 621 hyperlink, the next page displayed by the WPMA 150 is the Add Department page. Alternatively, when a user having the appropriate access privilege selects the "List Department" 621 hyperlink, the next page displayed by the WPMA 150 is the List Department page.

Figure 5B:
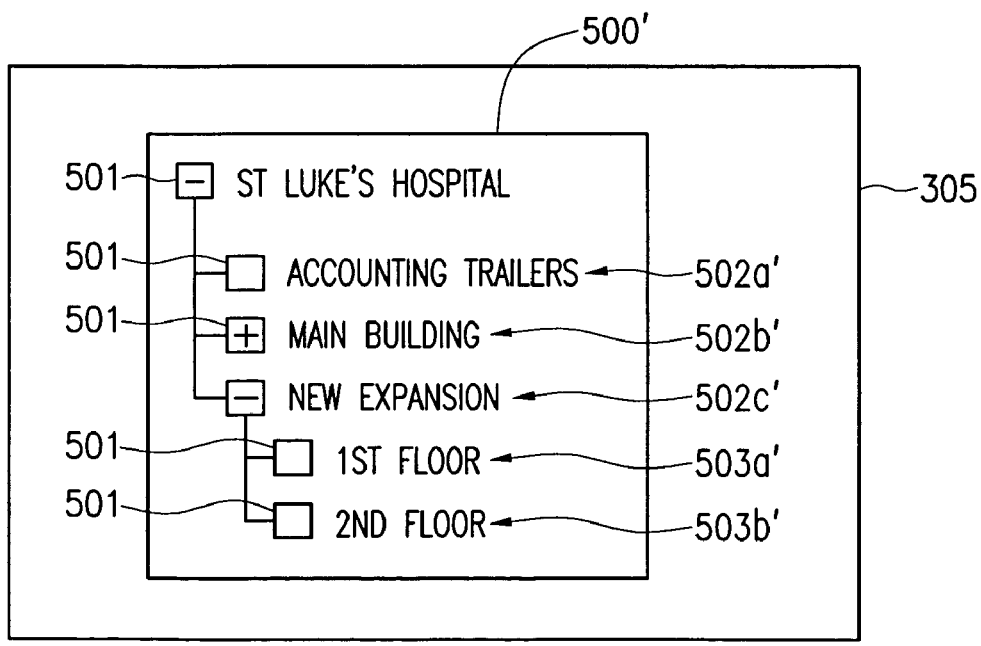
FIG. 5B is a illustration of a location browser.

The Add Department page is used to add a new Department to the WPMA 150. The Add Department page is similar to the Add User page shown in FIG. 7A, however, the fields of the Add Department page are different and used to collect information-relating to adding a new Department to the WPMA 150. In one exemplary embodiment, these fields include fields for receiving an ID (an unique alphanumeric sequence), a Name for the Department, a Description of the department, a cost center field, and controls for flagging whether a patient (e.g., for hospital industry) or work order (e.g., for manufacturing industry) is acuity based and a toggle for determining whether to have the activities of the department be reflected on a report. The context sensitive area 305 also includes an organization tree browser 500 (FIG. 5A). The organization tree browser is used to associate the newly defined Department with one of the existing groups. The context sensitive area 305 further includes another hierarchical control. As shown in FIG. 5B, the location browser 500' is similar to the group browser 500 of FIG. 5A, but is used to browse locations. As discussed below with respect to Location Administration, the WPMA 150 includes support for different locations. Since location data can be hierarchically organized (e.g., a floor of a building of an organization). The location browser 500' operates similarly to the group browser 500, and includes the same user interface element 501, but each field 502a'-502c', 503a', and 503b' relates to a different location instead of a different group.

Thus, in order to add a new group, the user would use the organization tree browser 500 to navigate to a Group where the new department should be added, use the location browser 500' to associate a location with the department, and enter a new department ID, department name, department description, cost center number into the appropriate fields, and toggle the controls to set the appropriate patient acuity status associated with the department, and whether the department should be considered when compiling reports. The Add Department page also has the same save 731, reset 732, and cancel 733 controls of the Add User page. These controls 731-733 can be used to control whether to create and save the new department.

The List Department page is used to list all Departments defined in the WPMA 150. The List Department page is similar to the List User page, however, the table instead includes rows wherein each row corresponds to a previously defined department ID, and includes a hyperlink having text identifying the department ID, and a limited amount of associated data, including a department name and a department ID. Clicking on a hyperlink of a department ID causes the WPMA to load a Edit Department page corresponding to the clicked department ID.

The Edit Department page is virtually identical to the Edit User, except that previously entered data regarding the selected Department is automatically placed in the appropriate fields. The page also includes a control for deleting the group. To edit a group, a user can update or replace the previously entered data and use the save control 731 to update the data.

IV.E. Location Administration

The Location Administration controls are used to manage the Location feature of the WPMA 150. The WPMA 150 supports tagging some objects with a location attribute, so that, for example, reports can be run based upon location. For example, a health care organization might operate two hospitals (for example, at two different locations in a city, or perhaps two separate cities). Alternatively, in one hospital some departments may be located in different buildings, or different floors of the same building. Similarly, work which must be performed, or resources which can perform work, can be tagged to specific locations. The pages in the Location Administration are used to add, list, or edit/delete location data. When a user having the appropriate access privilege selects the "Add Location" 621 hyperlink, the next page displayed by the WPMA 150 is the Add Location page. Alternatively, when a user having the appropriate access privilege selects the "List Location" 621 hyperlink, the next page displayed by the WPMA 150 is the List Location page.

The Add Location page is used to add a new Location to the WPMA 150. The Add Location page is similar to the Add Group page, however, the fields and hierarchical control of the Add Location page are different and used to collect information relating to adding a new Location to the WPMA 150. In one exemplary embodiment, these fields include fields for receiving an ID (an unique alphanumeric sequence), a Name for the location, a Description of the location, a type field (e.g., organization, campus, building, floor, room, bed). The context sensitive area 305 also includes a location browser 500' (FIG. 5B). The browser is used to associate the newly defined location with a parent location.

Thus, in order to add a new location, the user uses the browser 500' to navigate to a parent location where the new location should be added, and enter appropriate data in the above-described fields. The Add Location page also has the same save 731, reset 732, and cancel 733 controls of the Add User page. These controls 731-733 can be used to control whether to create and save the new department.

The List Location page is used to list all locations defined in the WPMA 150. The List Location page is similar to the List Group page, however, the context sensitive area 305 includes a location browser 500' instead of the group browser 500. Clicking on a hyperlink of an ID causes the WPMA to load a Edit Location page corresponding to the ID.

The Edit Location page is virtually identical to the Add Location, except that previously entered data regarding the selected location is automatically placed in the appropriate fields. The page, also includes a control for deleting the location. To edit a location, a user can update or replace the previously entered data and use the save control 731 to update the data.

IV.F. Acuity Administration

The Acuity Administration controls are used to manage the Acuity and Acuity Activities feature of the WPMA 150. Acuity refers to set of activities which require approximately a same level of skill and/or licensure for successful performance. For example, in one exemplary embodiment in the health care context, Acuities were defined on a numeric scale ranging from 1 to 5. Acuity 1 referred to skills required to perform activities such as those that might be performed on patients ready to be discharged, while acuity 5 referred to skills required in an emergency room to stabilize patients admitted in critical condition. Acuity Activities refer to various activities which are associated with different Acuities.

The pages in the Acuity Administration are used to add, list, or edit/delete Acuity or Acuity Activities. The Acuity Administration page therefore includes four hyperlinks instead of two. When a user having the appropriate access privilege selects the "Add Acuity" 621 hyperlink, the next page displayed by the WPMA 150 is the Add Acuity page. Alternatively, when a user having the appropriate access privilege selects the "List Acuity" 621 hyperlink, the next page displayed by the WPMA 150 is the List Acuity page. Similarly, when a user having the appropriate access privilege selects the "Add Acuity Activity" 621 hyperlink, the next page displayed by the WPMA 150 is the Add Acuity Activity page. Alternatively, when a user having the appropriate access privilege selects the "List Acuity Activity" 621 hyperlink, the next page displayed by the WPMA 150 is the List Acuity Activity page.

The Add Acuity page is used to add a new Acuity to the WPMA 150. The Add Acuity page is similar to the Add User page, however, the fields of the Add Acuity page are different and used to collect information relating to adding a new Acuity to the WPMA 150. In one exemplary embodiment, these fields include fields for receiving a level (an alphanumeric label), a ID (an unique alphanumeric sequence), and a description. Thus, in order to add a new Acuity, a user enter appropriate data in the above-described fields. The Add Acuity page also has the same save 731, reset 732, and cancel 733 controls of the Add User page. These controls 731-733 can be used to control whether to create and store the new Acuity.

The Add Acuity Activity page used to add a new Acuity Activity to the WPMA 150. The Add Acuity Activity page is similar to the Add User page, however, the fields of the Add Acuity Activity page are different and used to collect information relating to adding a new Acuity Activity to the WPMA 150. In one exemplary embodiment, these fields include fields for receiving a ID (an unique alphanumeric sequence), a description (a text field), and a definition (a text field). Thus, in order to add a new Acuity Activity, a user can enter appropriate data in the above-described fields. The Add Acuity Activity page also has the same save 731, reset 732, and cancel 733 controls of the Add User page. These controls 731-733 can be used to control whether to create and store the new Acuity Activity.

The List Acuity page is used to list all Acuities defined in the WPMA 150. The List Acuity page is similar to the List User page. The context sensitive area 305 includes a table having a plurality of rows, with each row corresponding to a Acuity and includes hyperlink having text identifying the Acuity Activity. Other columns of the table include the ID and description fields.

The List Acuity Activity page is used to list all Acuity Activities defined in the WPMA 150. The List Acuity Activity page is similar to the List User page. The context sensitive area 305 includes a table which includes a plurality of rows, with each row corresponding to a Acuity Activity and includes hyperlink having text identifying the Acuity Activity. Other columns of the table include the description and definition text fields.

The Edit Acuity and Edit Acuity Activity pages are respectively virtually identical to the Add Acuity and Add Acuity Activity pages, except that previously entered data regarding the selected Acuity or Acuity Activity is automatically placed in the appropriate fields. These pages also includes a control for deleting the Acuity or Acuity Activity. The data may be edited by having the user update the appropriate fields and using the save control 731.

IV.G. Skill Administration

The Skill Administration controls are used to manage the Skill feature of the WPMA 150. The pages in the Skill Administration are used to add, list, or edit/delete Skills. When a user having the appropriate access privilege selects the "Add Skill" 621 hyperlink, the next page displayed by the WPMA 150 is the Add Skill page. Alternatively, when a user having the appropriate access privilege selects the "List Skill" 621 hyperlink, the next page displayed by the WPMA 150 is the List Skill page.

The Add Skill page is used to add a new Skill to the WPMA 150. The Add Skill page is similar to the Add User page, however, the fields of the Add Skill page are different and used to collect information relating to adding a new Skill to the WPMA 150. In one exemplary embodiment, these fields include fields for receiving an ID (an unique alphanumeric sequence), and a description. The context sensitive area 305 may also include a control for identifying a previously defined skill as being an equivalent skill. Thus, in order to add a new Skill, a user enters appropriate data in the above-described fields and optionally identifies an equivalent skill. The Add Skill page also has the same save 731, reset 732, and cancel 733 controls of the Add User page. These controls 731-733 can be used to control whether to create the new Skill.

The List Skill page is used to list all Skills defined in the WPMA 150. The List Skill page is similar to the List User page. The context sensitive area 305 includes a table having a plurality of rows, with each row corresponding to a Skill and includes hyperlink having text identifying the Skill. Other columns of the table include the description fields.

The Edit Skill page is virtually identical to the Add Skill page, except that previously entered data regarding the selected Skill is automatically placed in the appropriate fields. These pages also includes a control for deleting the Skill. The data may be edited by having the user update the appropriate fields and using the save control 731.

V. Workflow Pages

A Workflow Page refers to a page which is accessed by using the hierarchical control on the Start Page to select a department. As such, a Workflow page is related to the selected department, which in the description below is referred to as the current department.

Figure 8:
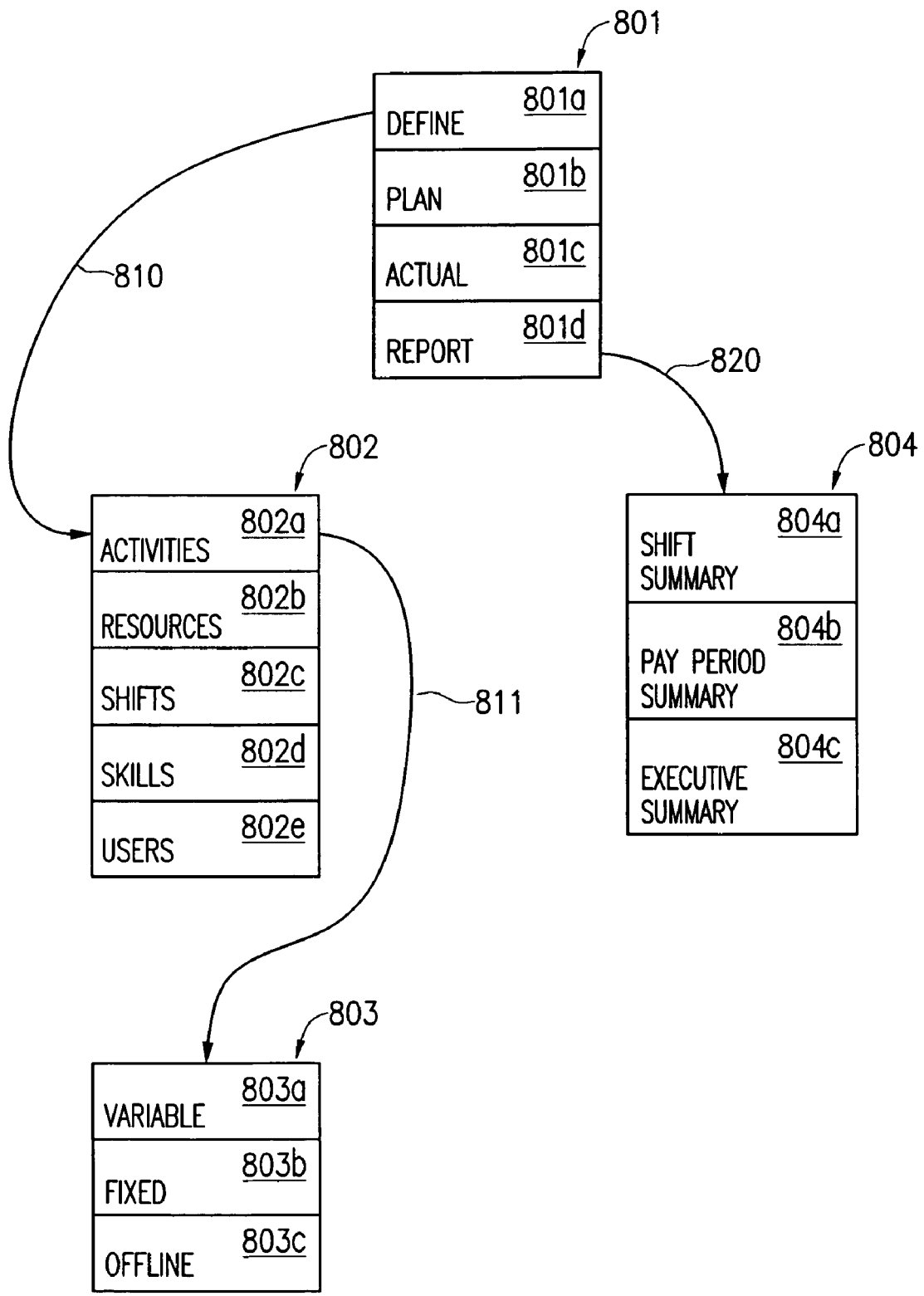
FIG. 8 is an illustration of a hierarchical menu used in the workflow pages according to one embodiment of the invention.

A Workflow page is based on the generic page 300. In one exemplary embodiment, the menu 302 of a Workflow page is a multi-level menu 801 having the organization shown in FIG. 8. That is, the menu items visible in the menu before any menu item is selected include the Define 801a, Plan 801b, Actual 801c, and Report 801d menu items. The link 810 shows that when the Define menu item 801a is selected a sub-menu 802 is displayed. The sub-menu 802 includes menu items labeled as Activities 802a, Resources 802b, Shifts 802c, Skills 802d, and Users 802e. The link 811 shows that when the Activities 802a menu item is selected, the sub-menu 803 is displayed. The sub-menu 803 includes menu items labeled Variable 803a, Fixed 803b, and Offline 803c. Similarly, the link 820 shows that when the Report 801d menu item is selected from menu 801, the sub-menu 804 is displayed. The sub-menu 804 includes menu items labeled Shift Summary 804a, Pay Period Summary 804b, and Executive Summary 804c.

V.A. Define Menu

The Define 801a menu item and its associated sub-menus 802, 803 are used when a user of the WPMA 150 needs to define or modify relationships between the current department and one or more objects (e.g., activities, resources, shifts, skills, and users). Each type of definable object is associated with a menu entry. Thus, activities, resources, shifts, skills, and users can be defined. To define (or edit) these relationships, the user uses an appropriate menu and/or sub-menu entry to select the other object. For example, in order to associated a fixed activity with the current department, the user would select the following menus and sub-menus: Define 801a, Activities 802a, Fixed 803b.

V.A.1. Define Activity Menu

The Define Activities Variable page is displayed by the WPMA 150 when the user selects the menu items of Define 801a, Activities 802a, and Variable 803a. This page is based on the generic page 300, but utilizes the menus 801-804. The context sensitive area 305 of the page includes a table of variable activities, in which the ID associated with the variable activity is listed as a hyperlink. Each row corresponds to a different variable activity and also includes controls (e.g. buttons) for causing the WPMA 150 to respectively display a Volume page and a Standard page. The context sensitive area 305 of the page also includes a control (e.g., a button) used to add a new variable activity. The user can add a new variable activity by using the control, which causes the WPMA 150 to display the Add New Variable Activity page, or edit/delete an existing variable activity by clicking on the hyperlink associated with the variable activity, which causes the WPMA 150 to display the Edit Variable Activity page. The Define Activities Fixed page and Define Activities Offline pages are pages which are respectively displayed when the user choose from menu 801-804 to respectively define Fixed or Offline activities. These pages are essentially identical to the Define Activities Variable page, except that they respectively related to fixed and offline activities. However, note that the Define Activity Offline page does not include the controls associated with the Volume page and the Standard page.

The Volume page is displayed by the WPMA 150 when the user activates an associated control on a table listing activities, and is therefore implicitly associated with a particular activity. This page is based on the generic page 300. The context sensitive portion 305 is a table. Each row of the table corresponds to a different shift, while each column is associated with a different weekday. The table itself is comprised of fields which accept a numeric input, so that a user may enter the volume of activity on a per-shift/per-weekday basis.

The Standards page is displayed by the WPMA 150 when the user activates an associated control on a table listing activities, and is therefore implicitly associated with a particular activity. This page is based on the generic page 300. The context sensitive portion 305 is a two column table. Each row of the first column is the ID of a different skill, while each row of the second column is a field which accepts a time. In this manner, the user can define how much time at each skill level is required to perform the implicitly associated activity.

VI.A.2. Define Resource Menu

The Define Resource page is displayed by the WPMA 150 when the user selects the menu items of Define 801a and Resource 802b. This page is for adding, editing, viewing, and deleting resources. A resource is an object necessary for performing work. One common example of a resource is an employee. The Define Resource page is based on the generic page 300, but utilizes the menus 801-804. The context sensitive area 305 of page includes a table of resources, with one row per employee. In one exemplary example, each row includes an employee ID (an unique alphanumeric sequence) presented as a hyperlink. Each row further includes the employee's name, and a control which can be selected to cause the WPMA 150 to display a Resource Scheduling page. Activating the hyperlink causes the WPMA 150 to display an Edit Resource page. The context sensitive area 305 includes additional controls for causing the WPMA 150 to respectively load a Add Resource page and a Skill Matrix page.

The Edit Resource page is used to change data regarding a resource. The Edit Resource page also includes a delete control, which can be used to delete the resource. In one exemplary embodiment, the Edit Resource page is based on the generic page 300 and has a context sensitive area 305 which includes a number of text labels and fields for accepting data regarding a resource's ID (an unique alphanumeric sequence), first, middle, and last names, title, and a primary skill associated with the resource. Previously entered data is preloaded into the appropriate fields. The save 731, reset 732, and cancel 733 buttons are also available in the context sensitive area for saving, resetting, or discarding the work done on this page.

The Resource Scheduling page is used to specify the work schedule of a resource. Each Resource Scheduling page is associated with a particular one of a resource because this page is accessed via a control associated a specific resource. In one exemplary embodiment, the Resource Scheduling page is based on the generic page 300 and has a context sensitive area suitable for accepting the number of hours the associated resource will be available to work in each of the shifts in a pay period. The save 731, reset 732, and cancel 733 buttons are also available in the context sensitive area for saving, resetting, or discarding the work done on this page.

The Add Resources page is used to add a new resource. The Add Resource page is virtually identical to the Edit Resource page, differing only in naming, a lack of a delete control, and that there would be no previously loaded data which is preloaded into any field.

The Skills Matrix page is used to create an association between each resource and each skill required in a department. In one exemplary embodiment, the Skills Matrix page based on generic page 300 and has a context sensitive area 305 which includes a table. The first column of the table may be the names of each user, presented in a hyperlink form, which if activated will cause the WPMA 150 to load the Edit Resource page associated with that resource. The second and subsequent columns of the table are check boxes corresponding to each skill used in the department. By default, the primary skill associated with the resource is automatically check. By using this table, the user can associate additional skills associated with each user by checking the appropriate check boxes. The save 731, reset 732, and cancel 733 buttons are also available in the context sensitive area for saving, resetting, or discarding the work done on this page.

V.A.3. Define Shifts Menu

The Define Shifts page is displayed by the WPMA 150 when the user selects the menu items of Define 801*a* and Shifts 802*c*. The Define Shifts page is a page used by the user for adding, editing, displaying, and deleting shifts. This page is based on the generic page 300. In one exemplary embodiment, the content sensitive area 305 includes a table with a first column consisting of shift IDs in hyperlink forms. The table preferably has seven additional columns, each corresponding to each weekday. These additional columns are used to indicate whether a particular shift includes time in each of the weekdays. Activating the hyperlink causes the WPMA 150 to display an Edit Shift page. The context sensitive area 305 includes additional controls for causing the WPMA 150 to load a Add Shift page.

The Edit Shift page is used to change data regarding a shift. The Edit Resource page also includes a delete control (e.g., button), which can be used to delete the resource. In one exemplary embodiment, the Edit Shift page is based on the generic page 300 and has a context sensitive area 305 which includes a number of text labels and fields for accepting data regarding a resource's ID (an unique alphanumeric sequence), starting time, and ending time. The context sensitive area 305 may include additional controls for specifying days of the week included in the shift. Previously entered data is preloaded into the appropriate fields and controls. The save 731, reset 732, and cancel 733 buttons are also available in the context sensitive area for saving, resetting, or discarding the work done on this page.

The Add Shift page is used to add a new shift. The Add Shift page is virtually identical to the Edit Shift page, differing only in naming, a lack of a delete control, and that there would be no previously loaded data which is preloaded into any field.

V.A.4. Define Skill Menu

The Define Skills page is displayed by the WPMA 150 when the user selects the menu items of Define 801*a* and Skills 802*d*. The Define Skills page is a page used by the user to specify which skills are associated with the current department. This page is based on the generic page 300. In one exemplary embodiment, the content sensitive area 305 includes a table with a first column consisting of skill IDs. The table preferably has one additional column listing the description of each skill. The context sensitive area 305 includes additional controls for respectively causing the WPMA 150 to load a Edit Skills page and the previously described Skills Matrix page.

The Edit Skills page is used to change data regarding a skill. In one exemplary embodiment, the Edit Shift page is based on the generic page 300 and has a context sensitive area 305 that includes two windows. The first window is a list of all defined skills while the second window is a list of all skills associated with the current department. An additional control permits the user to select one or more skills from list of all skills to copy to the list of department skills. Further, yet another control permits the user to remove a skill from the list of department skills. The save 731 and cancel 733 buttons are also available in the context sensitive area for saving, or canceling the work done on this page.

V.A.5. Define Users Menu

The Define Users page is displayed by the WPMA 150 when the user selects the menu items of Define 801*a* and Users 802*e*. The Define User page is a page that displays which users are associated with the current department. In one exemplary embodiment, the Define User page is based on the generic page 300 and has a context sensitive area 305 that includes a table listing the names, title, and telephone number of each user associated with the department.

V.B. Plan Menu

The Plan page is displayed by the WPMA 150 when the user selects the menu item Plan 801*b*. This page is used by a user having management rights with respect to the current department. This page is based on the generic page 300, having a context sensitive area 305 in the form of a table. In one exemplary embodiment, each row of the table has as its first column a hyperlink entry. Each hyperlink entry corresponds to a shift. The context sensitive area 305 may include additional controls (e.g., menus) which permit the user to filter the rows shown on the table to a specified range of dates or shift types. Additional columns of the table indicate whether a plan has been submitted for the hyperlinked shift. When the hyperlink is activated, the next page displayed by the WPMA 150 is the Shift Planning page.

It should be noted that in one exemplary embodiment, a modified FTE is used. As previously discussed, a FTE usually represents the amount of work performed by a worker. That is, if applicable labor laws and regulation mandate paid and/or unpaid breaks, such breaks would not be included in amount of time represented by an FTE because no work is performed while the worker is on break. Using this definition, however, would generally result in a difference in time between the amount of time in a shift and the amount of time in an FTE, which may be confusing for many users of the WPMA 150. Thus, in one exemplary embodiment, the definition of an FTE is modified to include any mandated breaks. For example, in one exemplary embodiment, an FTE based on a 8:00 AM to 4:30 PM shift having one 0.5 hour break and two 0.25 hour break would convert to 8.5 hours (instead of 7.5 hours). To compensate for this change, the WPMA 150 adjusts all time values by the amount corresponding to the required breaks. For example, each worker working a "standard shift" is converted into 8.5 hours of work, and the time required to perform each activity is increased by 0.5 hours per 8 hours of required time. Similar adjustments would be made for workers working overtime, since workers generally continue to earn paid breaks at a rate of 0.25 hour break.

The Shift Planning page is based on the generic page and has a series of tables in the context sensitive area 305. In one exemplary embodiment, the tables include a table listing defined activities (e.g., variable, fixed, and periodic activities, and breaks). Each activity listed in the table has an associated Edit control. If the Edit Control is activated, the WPMA 150 next displays an Edit Planned Activities page associated with the type of activity chosen. The other tables in the context sensitive area 305 are similar tables directed to resources and offline hours, and include Edit controls for respectively causing the WPMA 150 to load an Edit Planned Resource and an Edit Offline Activity pages. The data which populates the Shift Planning page is taken from the database and was originally entered when the WPMA 150 was customized via the Administration and Define pages.

The Shift Planning tables include numeric values indicating the number of hours (and/or FTE) required for perform all planned activities and the number of hours (and/or FTE) being worked by each resource, and the number of offline hours (and/or FTE) to show the user whether the planned amount of work can be performed by the available resource. If the current department includes work of varying acuity, the table would also be broken down by acuity (for activities) and skill (for resources) to further permit the user to check whether the department can complete its work.

The Edit Planned Activities page is based on the generic page 300 and has in one exemplary embodiment a context sensitive area 305 having a table. The first column of the table lists each activity's ID, the second column lists the standard associated with that activity, and the third column is an input box for soliciting a volume for that activity. The previously defined volume for each activity is preloaded into each corresponding input box, and the user may change the value by entering a new volume level and then using a save control 731 to save the new volume or a cancel control 733 to cancel.

The Edit Planned Resource and Edit Offline Activity pages are essentially identical to the Edit Planning Activity page except they are directed to editing resources and offline activity. For example, the Edit Planned Resource page lists each resource organized in groups by primary skill and includes input boxes for accepting the number of hours being worked by each person on that shift.

V.C. Actual Menu

The Actual page is displayed by the WPMA 150 when the user selects the menu item Actual 801c. This page is used by a user having management rights with respect to the current department. This page and its sub-pages are essentially identical to respective pages from the Plan page and its sub-pages. The function of the Actual page and its sub-pages, however, is for a user to enter the account volume levels and worker hours worked during a shift. This data is required in the database to permit reports to run to compare the actual workflow performed by the department to its planned workflow.

V.D. Report Menu

The Report page is displayed by the WPMA 150 when the user selects the menu item Report 801d. This page is used by a user to generate reports on the current department. In one exemplary embodiment, the Report page is based on the generic page 300 and does not have a context sensitive area 305. However, the Report page includes a sub-menu 804 including menu items for choosing Shift Summary 804a, Pay Period Summary 804b, and Executive Summary reports 804c. Each of these reports present data showing the number of units of service actually required on each shift, the budgeted amount, and the number of work resources per shift, for the current department (for shift and pay period reports). In the case of the Shift Summary and Pay Period Summary reports, the report data corresponds to the current department. In one exemplary embodiment, the Shift Summary report also includes an option for the WPMA 150 to automatically generate worker assignments. That is, the WPMA 150, having been provided information as to the amount work which must be performed, the skill level of a worker required to perform the work, the workers available, and the skill levels of each worker, would assign workers from the pool of available workers to the pool of work which must be performed. The user of the WPMA 150 may optionally choose different algorithms for the WPMA 150 to perform the assignment. For example, the user may choose to have the WPMA 150 generate the assignment to distribute work as evenly as possible over the pool of workers, or the assignment may assign work based on a different criteria. For the Executive Summary Report, the report data relates to one or more departments. Choosing any one of menu items 804a, 804b, 804c causes the WPMA 150 to display a Report Generator page.

The Report Generator page is based on the generic page 300 and includes as its context sensitive area 305 one or more controls for soliciting a specific shift and year if a shift summary report or pay period report is chosen. If an executive summary report is chosen the context sensitive area 305 includes additional controls for soliciting a date range and an organization group browser to selecting one or more organization groups. The context sensitive area 305 further include a control for causing the selected report to be generated. The report is generated by querying the database for data based on the selected report options.

VI. Report Page

The Report Page refers to a page which is accessed by using the Report menu item 801d on the Start Page. The Report Page includes a control to permit a user to select a report. In one exemplary embodiment, the Report Page includes a control (e.g., sub-menu item) to permit the user to select the Executive Report. Selecting the Executive Report brings up Report Generator page described above.

VII. Summary

Figure 9:
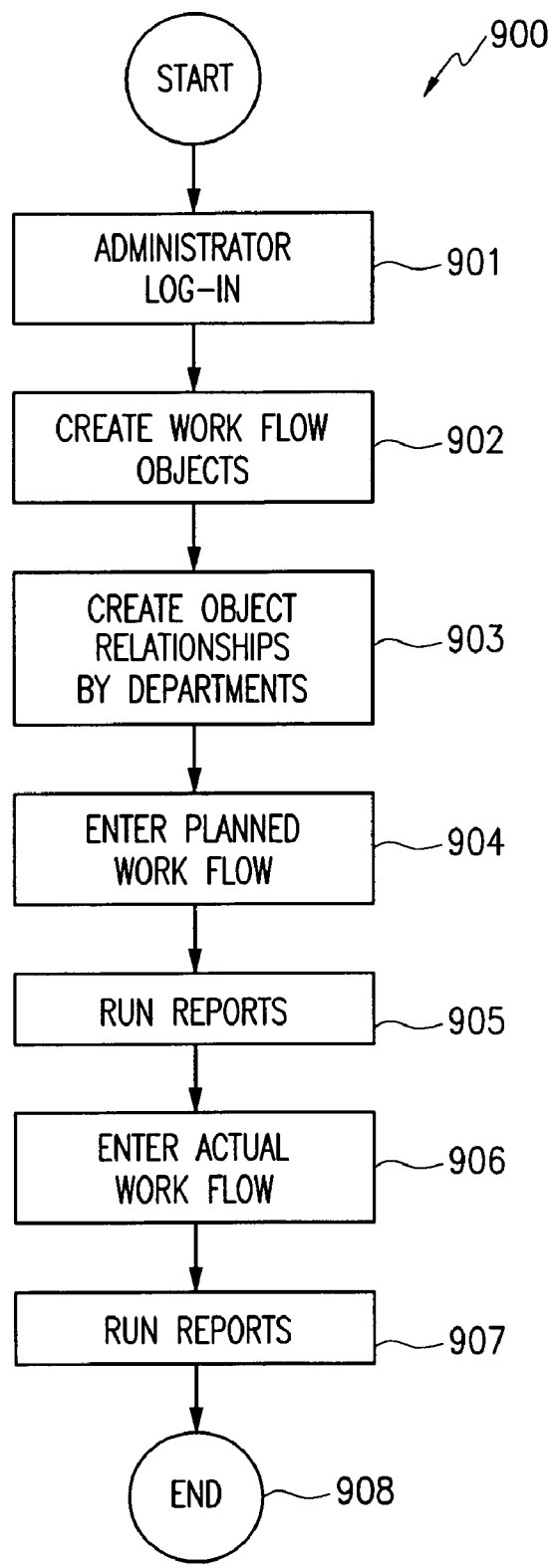
FIG. 9 is an illustration of a method for building a WPMA in accordance with one embodiment of the present invention.

The above-described exemplary embodiments provide embodiments of a development environment for building a WPMA suitable for any organization. In one exemplary embodiment, the development environment is a web based application having a web server front end and a database back end. Referring to FIG. 9, the development environment is used to create a WPMA in the following manner: The process 900 begins at step 901 where a default administrator user logs into the web application. At step 902, the administrator creates a variety of objects using the web based application. These objects model the organization by defining objects for each group, department, location, acuity, and activity. The objects also include objects required for the WPMA itself, such as users (of the WPMA). In one exemplary embodiment, this step is performed using the administrative function of the application. At step 903 the user associates, for each department, a series of relationship between other workflow and non-workflow objects (e.g., activities, resources, shifts, skills, and users). Once the relationships have been established between each department and the other objects, the WPMA becomes operational. To use the WPMA, at step 904 planned workflow data is entered (or alternatively calculated and stored in the database), and at step 905 reports regarding the planned workflow can be produced. At step 906 the actual workflow is entered, either manually and/or electronically, and reports regarding actual workflow, planned-vs-actual workflow, etc. can be produced in step 907. The process 900 ends at step 908.

While the invention has been described in detail in connection with exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. In particular, the specific embodiments of the described user interface should be taken as exemplary and not limiting. Accordingly, the invention is not limited by the

What is claimed as new and desired to be protected by Letters Patent of the United States is:

1. A method for creating a workflow process management application suitable for an organization, comprising:
   (a) creating, on a computer system, a plurality of department objects, each of said department objects being associated with a respective department of said organization;
   (b) creating, on said computer system, a plurality of resource objects, each resource object being associated with at least one of said department objects and a production resource of said organization;
   (c) creating, on said computer system, a plurality of activity objects, each activity object being associated with at least one of said department objects and an activity of said organization; and
   (d) after steps (a), (b), and (c), and responsive to a command, automatically generating, by said computer system, said workflow process management application from said department objects, resource objects, and activity objects;
   wherein said workflow process management application, when executed by said computer, permits a user to:
      enter, for each department, a workflow plan for said department,
      generate worker assignments,
      receive a workflow performed by departments of said organization, and
      create a report comparing said workflow plan with said workflow performed;
   said workflow process management application using said report to automatically generate subsequent worker assignments without further interaction with the user;
   wherein said workflow plan comprises a plurality of standards, each one of said standards inter-relating at least one activity object with at least one resource object as a function of time and skill level.

2. The method of claim 1, wherein in said workflow process management application, said user enters a workflow plan by creating relationships between said resource and activity objects for each department.

3. The method of claim 1, wherein said plurality of activity objects comprise a plurality of fixed activity objects and variable activity objects.

4. The method of claim 1, further comprising:
   selecting from a group of templates, a selected template; and
   after said selecting, automatically creating a plurality of department, resource, and activity objects associated with said selected template.

5. The method of claim 4, wherein said group of templates includes a template associated with hospital management and said plurality of department, resource, and activity objects associated with said template are respectively associated with departments, resources, and activities of a hospital.

6. The method of claim 1, further comprising:
   creating, on said computer system, a plurality of objects related to groups, locations, and acuities;
   wherein said set of objects further comprises said plurality of objects related to groups, locations, and acuities.

7. The method of claim 6, wherein in said workflow process management application, said user enters a workflow plan by creating relationships between said resource objects, activity objects, and objects related to groups, locations, and acuities.

8. A computer readable medium, comprising:
   a web based application comprising a plurality of web pages and a plurality of database tables, said web based application being executable by a computer;
   wherein the computer, when executing the application, permits a user to:
      (a) create, a plurality of department objects, each respectively associated with a department;
      (b) for each of said plurality of department objects,
         create a plurality of resource objects, each resource object being associated with at least one of said department objects and a production resource of said organization using a skill matrix,
         create a plurality of activity objects, each activity object being associated with at least one of said department objects and an activity of said organization, and
      (c) after steps (a) and (b), and responsive to a command by said user, cause said computer to automatically generate a workflow process management application from said department objects, resource objects, and activity objects;
   wherein
      said workflow process management application permits said user to enter, for each department, a workflow plan for said department, receive a workflow performed by departments of said organization, and create a report comparing said workflow plan with said workflow performed,
      said workflow plan comprises a plurality of standards, each one of said standards inter-relating at least one activity object with at least one resource object as a function of time and skill level, and
      said workflow process management application defines acuities, each acuity including a set of activities that require a minimum skill level and/or licensure, and uses said acuities to determine worker assignments, and said workflow process management application uses said report to automatically generate subsequent worker assignments without further interaction with the user.

9. The computer readable medium of claim 8, wherein in said workflow process management application, said user enters a workflow plan by creating relationships between said resource and activity objects for each department.

10. The computer readable medium of claim 8, wherein said application further permits said user to create a plurality of objects related to groups, locations, and acuities, and said set of objects further comprises said plurality of objects related to groups, locations, and acuities.

11. The computer readable medium of claim 8, wherein in said workflow process management application, said user enters a workflow plan by creating relationships between said resource objects, activity objects, and objects relating to groups, locations, and acuities.

12. An apparatus for creating a workflow process management application for an organization, comprising:
   a computer system, including a processor for executing code and a mass storage device; and
   an application for execution on said computer system;

wherein the computer system, when executing said application, permits a user to:

(a) create a plurality of department objects, each respectively associated with a department;

(b) for each of said plurality of department objects, create a plurality of resource objects, each resource object being associated with at least one of said department objects and a production resource of said organization;

create a plurality of activity objects, each activity object being associated with at least one of said department objects and an activity of said organization; and (c) after steps (a) and (b), and responsive to a command by said user, cause said computer system to generate a workflow process management application from said department objects, resource objects, and activity objects, wherein said workflow process management application permits a user to enter, for each department, a workflow plan for said department, generate worker assignments, create a first report corresponding to planned workflow and expected needs, receive a workflow performed by said organization, and create a second report comparing said workflow plan with said workflow performed to automatically determine workflow productivity, said workflow process management application uses said second report to automatically generate subsequent worker assignments without further interaction with the user, said workflow plan comprises a plurality of standards, each one of said standards inter-relating at least one activity object with at least one resource object as a function of time, and said workflow process management application defines acuities, each acuity including a set of activities that require a minimum skill level and/or licensure.

13. The apparatus of claim 12, wherein in said workflow process management application, said user enters a workflow plan by creating relationships between said resource and activity objects for each department.

14. The apparatus of claim 12, wherein said plurality of activity objects comprise a plurality of fixed activity objects and variable activity objects.

15. The method of claim 1, further comprising:
displaying a page in a user interface, said page comprising:
a logo region;
a menu region, including at least one menu item;
a navigation region; and
a context sensitive area.

16. The method of claim 15, wherein the objects created in said creating step are based on user events generated by a user interacting with said menu region, navigation region, and context sensitive area.

17. The method of claim 15, wherein said context sensitive area includes a hierarchical control object for showing and hiding a list of hierarchical objects.

18. The method of claim 17, wherein said hierarchical objects comprise at least one department of said organization.

19. The method of claim 17, wherein
said application further permits said user to create a plurality of objects related to groups, locations, and acuities,
said set of objects further comprises said plurality of objects related to groups, locations, and acuities, and
said hierarchical objects comprise at least one location of said organization.

20. The method of claim 15, wherein said menu region comprise at least one of a menu item and a sub-menu.

* * * * *